United States Patent [19]
Baker

[11] Patent Number: 4,720,172
[45] Date of Patent: Jan. 19, 1988

[54] LIQUID CRYSTAL OPTICAL SWITCHING DEVICE

[75] Inventor: Anthony P. Baker, New York, N.Y.

[73] Assignee: ITT Defense Communications, A Division of ITT Corporation, Nutley, N.J.

[21] Appl. No.: 795,156

[22] Filed: Nov. 5, 1985

[51] Int. Cl.⁴ ............................ G02F 1/13; G02B 6/42
[52] U.S. Cl. ............................... 350/334; 350/96.13; 350/96.14; 350/339 R; 350/347 V
[58] Field of Search ............ 350/347 E, 347 V, 331 R, 350/339 R, 96.22, 96.14, 96.13, 96.18, 334

[56] References Cited

U.S. PATENT DOCUMENTS

| | | | |
|---|---|---|---|
| 3,950,075 | 4/1976 | Cook et al. | 350/96.22 |
| 4,385,799 | 5/1983 | Soref | 350/347 V |
| 4,411,495 | 10/1983 | Beni et al. | 350/331 R |
| 4,478,494 | 10/1984 | Soref | 350/347 E |
| 4,556,288 | 12/1985 | Sekimura | 350/339 R |

OTHER PUBLICATIONS

R. A. Soref, "Fiber-Optic Switching with Liquid Crystals," *Spie Guided Wave Optical Systems and Devices II*, vol. 176, Apr., 1979, pp. 124–132.

Primary Examiner—Bruce Y. Arnold
Assistant Examiner—Martin Lerner
Attorney, Agent, or Firm—Robert A. Walsh; Thomas N. Twomey; Mary C. Werner

[57] ABSTRACT

A liquid crystal optical switching device includes a plurality of ports each having associated therewith a blind hole receiving an optical fiber that is secured subsequent to the alignment thereof. The switching device is fabricated from inexpensive material and includes a minimum of optically flat surfaces.

29 Claims, 8 Drawing Figures

LIQUID CRYSTAL OPTICAL SWITCHING DEVICE

CROSS-REFERENCE TO RELATED APPLICATIONS

This application is related to one, or more, of the following U.S. patent applications: Ser. No. 795,151; Ser. No. 795,152; Ser. No. 595,150; Ser. No. 795,155; Ser. No. 795,138; Ser. No. 795,148; Ser. No. 795,157; Ser. No. 795,154; Ser. No. 795,149; Ser. No. 795,296 all filed on even date herewith. All of the above applications are assigned to the assignee hereof.

BACKGROUND OF THE INVENTION

The present invention generally relates to a liquid crystal optical switching device and, in particular, relates to one such switching device having such port thereof including means, extending toward a liquid crystal material, for receiving an optical fiber.

The use of optical fibers as a telecommunication transmission medium has numerous advantages compared to existing telecommunication transmission media. For example, optical fibers can sustain signals having wider bandwidths and hence can convey larger quantities of information than existing media. Further, light waves are shorter than the conventional microwaves currently used in many existing telecommunications systems and thus a substantial reduction in the physical size of components is readily achievable. This size reduction further results in cost reductions for materials, packages and manufacturing. Still further, current optical fibers exhibit little or no electromagnetic radiation or radio frequency radiation, thus resulting in little or no impact on the surrounding environment.

To be viable, however, every telecommunication system must include some means for controllably redirecting a signal, or a portion thereof, to or from a transmission medium, or between one or more such media. In the case of an optical telecommunication system, the means is an optical switch. Conventionally, the majority of optical switches have been mechanical although recently liquid crystal switches have been proposed.

In general, mechanical switches require relatively high driving power and are subject to wear, abrasion and fatigue. Further, mechanical switches are prone to failure after repeated use. In addition, since a rather small optical fiber is usually displaced from alignment with a first port fiber to alignment with another port fiber, mechanical switches are expensive, due to the very small tolerances allowed to ensure the proper alignments.

Advantageously, a liquid crystal optical switching device has no moving parts and is thus free from many of the drawbacks of mechanical switches. Proposed liquid crystal optical switches have been described in U.S. Pat. No. 4,201,442 issued to McMahon et al. on May 6, 1980, U.S. Pat. No. 4,278,327 issued to McMahon et al. on July 14, 1981; and U.S. Pat. No. 4,385,799 issued to Soref on May 31, 1983. Therein, liquid crystal switches are described having optical fibers attached to the side angled surfaces of a pair of trapezoidal prisms. The trapezoidal prisms are arranged with the bases thereof parallel and liquid crystal material is positioned therebetween.

Although the optical switches described by these references have some advantages over mechanical switches, i.e. no moving parts, these liquid crystal switches are both expensive and quite difficult to mass produce.

Specifically, each set of trapezoidal prisms must be precisely matched to ensure the exactness of the optical path, the trapezoidal prisms must also be optically flat to avoid detrimental light scattering at the surface and, in addition, must be optically pure to avoid internal light scattering. Light scattering and optical path inaccuracy can result in both signal loss and crosstalk. Further, to manufacture such a switch each optical fiber must be attached precisely perpendicularly to the angled surface of the trapezoidal prism to avoid surface reflections and diffraction. Still further, the trapezoidal prisms must be precisely aligned to each other to avoid signal losses. In addition, the location of the optical fibers on the prism surfaces is critical to avoid substantial signal losses caused by misalignments. As a result, the optical switches described in these references are quite impractical for optical communication systems.

Consequently, since a typical telecommunication network may include hundreds, if not thousands, of switching devices, a low cost, easily mass produced optical switching device is needed in order to fully realize the advantages of an optical telecommunication system.

SUMMARY OF THE INVENTION

Accordingly, it is one object of the present invention to provide an inexpensive liquid crystal optical switching device utilizing liquid crystal material that provides high performance and is amenable to mass production techniques.

This object is accomplished, at least in part, by a liquid crystal optical switching device wherein each port thereof includes means, extending toward the liquid crystal material, for receiving an optical fiber.

Other objects and advantages will become apparent to those skilled in the art from the following detailed description read in conjunction with the appended claims and the drawings attached hereto.

DETAILED DESCRIPTION OF THE INVENTION

Figure 1:
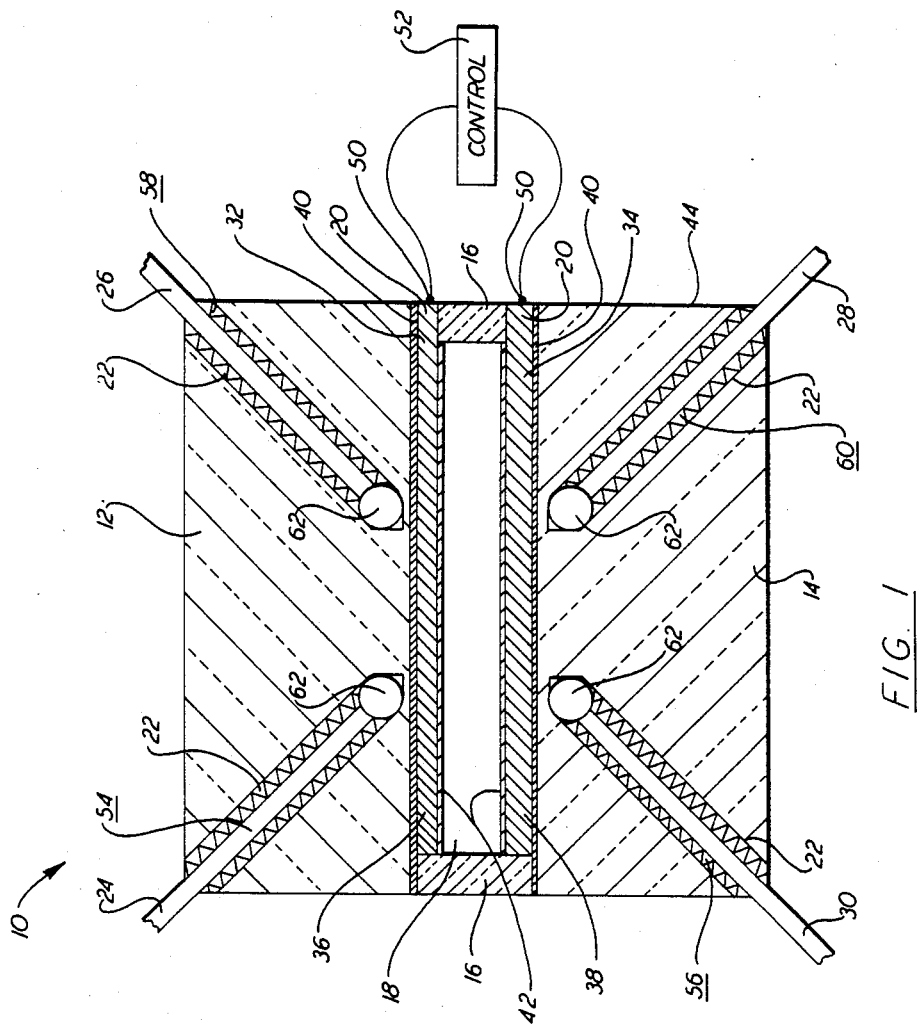
FIG. 1 is a cross sectional view, not drawn to scale, of a liquid crystal optical switching device embodying the principles of the present invention.

A liquid crystal optical switching device, generally indicated at 10 in the drawing and embodying the principles of the present invention, includes first and second transparent members, 12 and 14, respectively, means 16 for retaining a liquid crystal material 18 between the transparent members, 12 and 14, means 20 for sustaining an electromagnetic field across at least a portion of the liquid crystal material 18 and means 22, extending into the transparent members, 12 and 14, for receiving a plurality of optical fibers 24, 26, 28 and 30.

In one preferred embodiment, each of the first and second transparent members, 12 and 14, respectively, includes an optically flat surface, 32 and 34, respectively. The first and second transparent members, 12 and 14, respectively, are oriented such that the opticaly flat surfaces, 32 and 34, respectively, thereof are proximate the liquid crystal material 18 retained therebetween. Preferably, the material of the first and second transparent members, 12 and 14, respectively, is machinable by conventional mass production techniques, for example, drilling, molding and milling. One particularly inexpensive material useful for the transparent members, 12 and 14, is clear plastic. Alternatively, the first and second transparent members, 12 and 14, respectively, may be made by conventional plastic molding techniques.

The liquid crystal retention means 16 can be any type of spacer formed of material that is inert to the liquid crystal material 18, for example, ordinary glass. In one implementation, the spacer material is retained in position, and acts to retain the first and second transparent members, 12 and 14, respectively, in their relative positions with respect to each other, by an epoxy. Preferably, the epoxy is inert to the liquid crystal material 18 and of a type that can be cured via ultraviolet heating.

The means 20 for sustaining an electromagnetic field includes, in one embodiment, first and second electrodes, 36 and 38, respectively spaced apart and overlying the optically flat surfaces, 32 and 35, respectively, of the first and second transparent members, 12 and 14, respectively. In an alternative embodiment, the first and second electrodes, 36 and 38, respectively, can be interdigitated and overlie only one of the optically flat surfaces, 32 or 34. The advantage of disposing an electrode, 36 or 38, over each optically flat surface, 32 and 34, is that each transparent member, 12 or 14, can then be manufactured by an identical process. The advantage of interdigitated electrodes is that, since the alteration of the liquid crystal optical properties is a surface phenomenon, a lower control voltage can be used. That is, the spacing between adjacent fingers of the first and second interdigitated electrodes can be made smaller than the thickness of the liquid crystal material 18. Hence, less voltage is required to create an electromagnetic field of a given strength between the fingers than the voltage required to create the same electromagnetic field across the liquid crystal material 18. In any event, the electrodes, 36 and 38, are made sufficiently thin that they are transparent to the light wavelength to be switched. Alternatively, the electromagnetic field can be induced without the use of the electrodes, 36 and 38, by impressing a magnetic field across the device 10.

In the preferred embodiment each electrode, 36 and 38, is spaced apart from the transparent member, 12 and 14, respectively, associated therewith by a means 40 for matching the index of refraction of the member, 12 or 14, to the index of refraction of the electrode, 36 or 38, respectively. Further, each electrode, 36 and 38, is spaced apart from the liquid crystal material 18 by a means 42 for matching the index of refraction of the electrodes, 36 and 38, to that of the liquid crystal material 18. For example, one clear plastic material usually has an index of refraction on the order of about 1.6, whereas a typical electrode, 36 and 38, such as Indium Tin Oxide (ITO), has an index of refraction of about 1.9 and a typical liquid crystal material 18 has an index of refraction on the order of about 1.6. Hence, in order to avoid losses due to refraction at the interface between mismatched materials, the indices of refraction therebetween must be matched, for example, by a single layer of material having a graduated index of refraction or, alternatively, a plurality of layers having different indices of refraction. The index of refraction matching, in one embodiment, is accomplished by techniques discussed and described in U.S. patent application Ser. No. 795,150 entitled LIQUID CRYSTAL CELL FOR USE IN AN OPTICAL SWITCH, filed on even date herewith and assigned to the assignee hereof. This application is deemed incorporated herein by reference. Further, it is preferred that the surface adjacent the liquid crystal material 18 include a surfactant layer, such as 300 Angstrom of SiO to ensure the orientation of the liquid crystal molecules in the absence of an electromagnetic field.

Preferably, and regardless of the disposition of the electrodes, 36 and 38, with respect to the optically flat surfaces, 32 and 34, respectively, the electrodes, 36 and 38, extend to an edge 44 of the liquid crystal switching device 10 whereat control voltage leads, 46 and 48, can be connected thereto by, for example, electrically conductive epoxy 50 or other similar connection methods. The leads, 46 and 48, can then be connected to a control voltage source 52.

The liquid crystal switching device 10 has, in one embodiment, first and second input ports, 54 and 56, respectively, and first and second output ports, 58 and 60, respectively. Preferably, as shown in FIG. 1, each transparent member, 12 and 14, includes one input port, 54 and 58, respectively, and one output port, 56 and 60, respectively. Each port, 54, 56, 58 and 60, includes the means 22 for receiving an optical fiber, 24, 30, 26 and 28, respectively. In the preferred embodiment, the means 22 for receiving an optical fiber includes a blind hole that can be drilled, by conventional techniques, into the plastic members, 12 and 14, at an angle that is equal to, or slightly greater than, the optical critical angle with respect to the optically flat surface, 32 and 34, respectively, thereof. As known in the optical art, the critical angle, usually designated $\phi_c$, is that angle at which an incoming light beam is totally reflected from the surface that it impinges upon. Preferably, although not necessarily, the blind holes that are oriented, with respect to the optically flat surfaces, 32 and 34, so that even if an optical fiber is secured therein at the least favorable position that optical fiber is nevertheless at an angle at least equal to the critical angle $\phi_c$. This is desirable since a misalignment of a light beam to an angle even slightly less than the critical angle effectively debilitates the device 10 whereas little effect results if the incident beam impinges at an angle slightly greater than the critical angle.

The blind hole of each port, 54, 56, 58 and 60 is provided with a spherical, or bead, lens 62 having an anti-reflection coating that is epoxied in place by an index of refraction matching epoxy. The optical fibers, 24, 26, 28 and 30, are subsequently aligned and epoxied to the lines in the blind hole, thereby ensuring permanent optical alignment of the ports, 54, 56, 58 and 60, with the optically flat surfaces, 32 and 34.

The device 10 as described above is readily amenable to mass production techniques not only due to the symmetry of the transparent members, 12 and 14, but additionally by the fact that the optical fiber, 24, 26, 28 and 30, connected to each port, 54, 58, 60 and 56, respectively, extends into the first and second transparent member, 12 and 14, respectively, toward the liquid crystal material 18 and, upon alignment, are permanently fixed in position. This feature not only reduces the internal scattering losses due to impurities but allows the device 10 to be made very much smaller than other devices having connections at the external surface of the transparent members, 12 and 14, encasing the liquid crystal material 18. Furthermore, the need for a multiplicity of optically flat surfaces on each member is avoided. The transparent members, 12 and 14, in the preferred embodiment, are essentially identical to each other and hence the only matching between components that is necessary, if desired, is the matching of the optical flatness of the optically flat surfaces, 32 and 34. However, as all the members, 12 and 14, can be fabricated by use of the same process, such subsequent matching is not generally required. As aforementioned, the transparent members, 12 and 14, can be manufactured using known and conventional machine techniques with the ports, 54, 56, 58 and 60, being accurately formed by known mass production drilling and molding techniques.

The disposition of the electrodes, 36 and 48, and the index of refraction matching means, 40 and 42, can also be performed by conventional vacuum disposition or sputtering techniques on each transparent member, 12 and 14, in a production line fashion using known techniques. Preferably, the electrodes, 36 and 38, are on the order of about 300 Angstroms thick. The optical fibers, 24, 26, 28 and 30, can be attached either before or after the liquid crystal material 18 is retained by using known optical fiber alignment techniques. In one technique, three rods are inserted around the optical fiber, 24, 26, 28 or 30, into the blind hole and a conventional three point positioning device is temporarily attached to shift the optical fiber, 24, 26, 28 or 30, into alignment. Preferably, the optical fiber, 24, 26, 28 or 30, is brought into contact with the bead or spherical lens 62. Upon alignment, an index of refraction matching transparent epoxy is poured into the blind hole and cured. Hence, upon curing the optical fiber, 24, 26, 28 or 30, is optically aligned and completely secured within the blind hole.

In one particular assembly method the liquid crystal material 18 of the switching device 10 is a discrete liquid crystal cell such as that discussed and described in the above referenced patent application entitled, LIQUID CRYSTAL CELL FOR USE IN AN OPTICAL SWITCH.

In such a manufacturing method, the discrete cell is secured on either side to the optically flat surfaces, 32 and 34, of the first and second transparent, 12 and 14, respectively, by an index of refraction matching epoxy. Hence, in such a manufacturing technique only three parts need be assembled, two being identical.

In one particular embodiment, the first and second transparent members, 12 and 14, respectively, are about 3.5 centimeters thick and can have any surface profile desired, i.e., rectangle, circular, hexagonal, or the like. Each blind hole has a diameter of about 2 millimeters and extends into the transparent member, 12 or 14, and axial distance of about 3 millimeters. Each lens 62 is a spherical collimating lens having a diameter of about 1.5 millimeters. The electrodes, 36 and 38, are about 300 Angstrom of Indium Tin Oxide and the liquid crystal material is Stock Number EM1132, manufactured and marketed by Merck & Co. of Rahway, N.J., and is applied to a thickness of about 6 micrometers. In such a specific device the control voltage to effect switching is about 20 volts. Such a device is thus capable of accepting optical fibers, 24, 26, 28 and 30, having an outside diameter, including cladding, of about 125 micrometers. Preferably, in order to increase the switching speed of the device 10 and decrease cross-talk a bias voltage, less than the switching voltage, for example, about 1.5 volts, is maintained across the electrodes, 36 and 38.

Figure 2A:
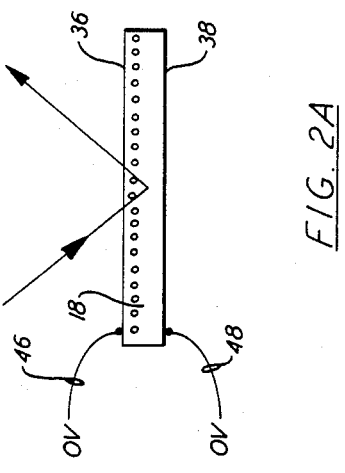
FIGS. 2A and 2B are ray tracing diagrams of the switching device shown in FIG. 1 utilizing parallel polarized light.
Figure 2B:
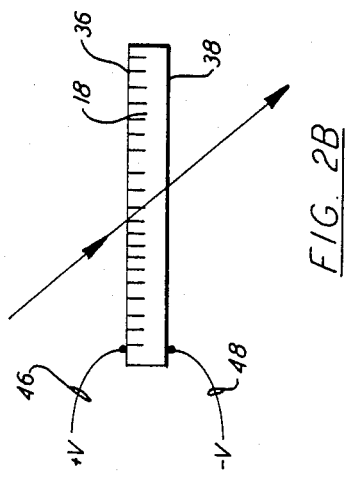

The device described 10 above operates to switch either parallel or perpendicularly polarized light. With reference to FIG. 2, the switch conditions for parallel polarized light are shown by the ray tracings thereof. With no voltage applied across the electrodes 36 and 38, parallel light is reflected by the liquid crystal material 18 having homogenically ordered molecules. When a voltage is applied, as shown in FIG. 2B, the liquid crystal molecules are ordered and are of a positive isotropy.

Figure 3A:
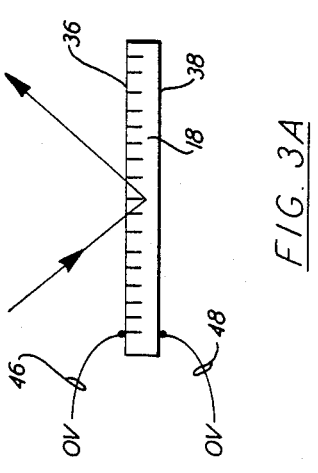
FIGS. 3A and 3B are ray tracing diagrams of the switching device shown in FIG. 1 with perpendicularly polarized light.
Figure 3B:
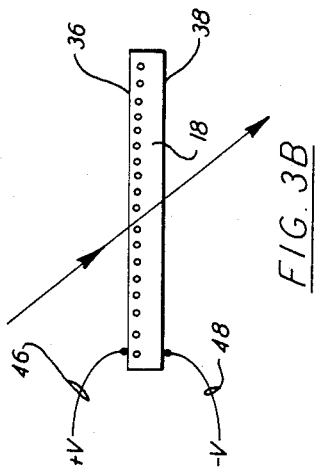

Similar ray tracings are shown for perpendicularly polarized light and similar voltage conditions in FIG. 3. FIG. 3A refers to the path of perpendicularly polarized light when no voltage is applied to the electrodes, 36 and 38. FIG. 3B is the condition when the liquid crystal molecules are ordered and of a positive isotropy with the voltage applied as shown.

The device 10, as described, thus is capable of switching, between two output ports, 58 and 60, any parallel or perpendicularly polarized light provided at either of the input ports, 54 or 56. However, unless the incoming signal at the input port, 54 or 56, is either parallel or perpendicularly polarized, one half of the signal will be lost due to the ability of the device 10 to switch only a single polarization.

From FIGS. 2 and 3 it will be recognized that the specific designations of "input" or "output" are for descriptive purposes only and that the device 10 is bidirectional. More specifically, any port, 54, 56, 58 or 60, can receive a light signal and this be an "input" port. Further, although the inputted light beam shown as being totally switched between the output ports, 58 and 60, in FIGS. 2 and 3, if less than the required full switching voltage is applied to the electrodes, 36 and 38, only a portion of the inputted light beam will be switched. Hence, the switching device 10, by regulating the voltage applied to the electrodes, 36 and 38, can be operated as a shutter, or the like.

Figure 4A:
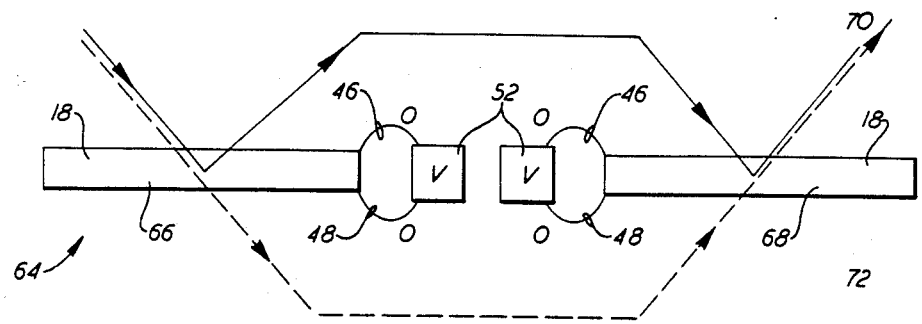
FIGS. 4A to 4C are ray tracing diagrams of an apparatus, not drawn to scale and embodying the principles of the present invention, for switching unpolarized light.
Figure 4B:
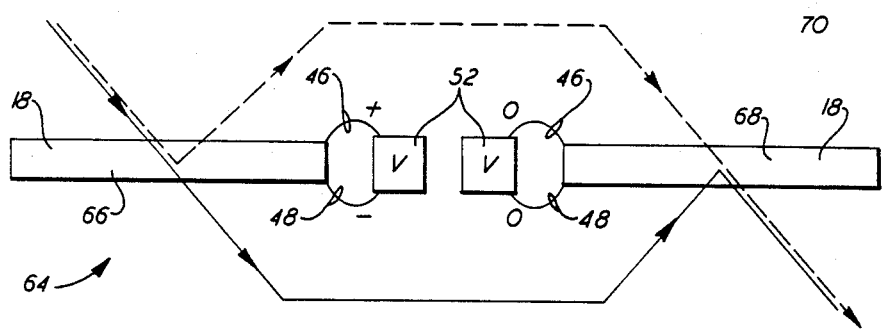
Figure 4C:
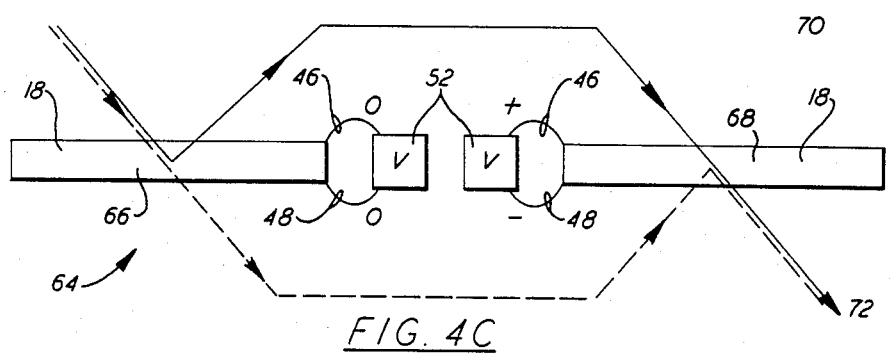

An apparatus, generally indicated at 64 in FIG. 4 and embodying the principles of the present invention, is adapted to switch light containing both parallel and perpendicular polarizations without loss of signal. As shown in FIG. 4A, the apparatus 64 shown in an unpowered state, includes first and second liquid crystal optical switching devices, 66 and 68, respectively, that are essentially identical to the device 10 shown in FIG. 1. The ray tracings in FIGS. 4B and C demonstrate the ability of the apparatus 64 to switch a light signal having both perpendicular and parallel polarizations between a first output port 70 and a second output port 72. In FIG. 4B the device 66 is powered i.e. switched, whereas in FIG. 4C the device 68 is powered to affect the switching of the output signal from port 70 to port 72. In the ray tracings the solid line ray trace path depicts the perpendicularly polarized portion of an inputted light signal whereas the dashed ray tracing represents the path of the parallel polarized portion of the inputted light signal.

The devices, 10, 66 and 68, discussed throughout with regard to the ray tracing shown, include the liquid crystal material 18, that is a nematic liquid crystal material. Naturally, other types of liquid crystal materials, such as cholesteric or smectic, can also be used and other polarizations of light can also be switched.

The device 10, and consequently the apparatus 64, described herein is inexpensive and easily produced by known mass production techniques, since the materials are less expensive and the tolerances required are readily achievable by known manufacturing techniques. Consequently, such an optical switching device 10, even when used twice as in the apparatus 64, is readily adaptable for use throughout an entire telecommunications network.

Although the present device has been described with respect to specific embodiments it will be understood that other arrangements and configurations can also be derived herefrom that nevertheless do not depart from the spirit and scope of the present invention. Hence, the present invention is deemed limited only by the claims and the reasonable interpretation hereof.

What is claimed is:

1. A liquid crystal optical switching device which comprises:
    a first transparent member, said first transparent member having a liquid crystal material overlying one surface thereof;
    means, extending into said first transparent member, for receiving a plurality of optical fibers; and
    means for switching at least a portion of a light beam impinging on said liquid crystal material from one of said optical fibers to another optical fiber.
2. Device as claimed in claim 1 wherein each said optical fiber receiving means includes a blind hole.
3. Device as claimed in claim 2 further comprising:
    means, associated with each said optical fiber receiving means, for collimating said light beam.
4. Device as claimed in claim 3 wherein said light beam collimating means is a bead lens disposed within said blind hole.
5. Device as claimed in claim 1 wherein said light beam switching means includes:
    means for selectively establishing an electromagnetic field in said liquid crystal material.
6. Device as claimed in claim 5 wherein said electromagnetic field establishing means includes:
    first and second spaced apart electrodes; and
    means for impressing a control voltage thereon whereby the refractive index of said liquid crystal material is changed, said change of said refractive index being dependent upon the magnitude and polarity of said control voltage.
7. Device as claimed in claim 1 wherein said one surface is an optically flat surface.
8. Device as claimed in claim 1 further comprising:
    a second transparent member having one surface thereof opposing said one surface of said first transparent member, said liquid drystal material being disposed between said one surfaces of said first and second transparent members; and
    means, extending into said second transparent member, for receiving at least one optical fiber.
9. Device as claimed in claim 8 wherein each optical fiber receiving said means extending into said first transparent member includes a blind hole disposed at about the critical angle to said one surface of said first transparent member and said optical fiber receiving means extending into said second transparent member includes a blind hole disposed at about the critical angle to said one surface of said second transparent member.
10. Device as claimed in claim 9 further comprising:
    means, associated with each said optical fiber receiving means, for collimating a light beam.
11. Device as claimed in claim 10 wherein said light beam collimating means is a bead lens within said blind hole.
12. Device as claimed in claim 9 wherein said light beam switching means includes:
    means for selectively establishing an electromagnetic field in said liquid crystal material.
13. Device as claimed in claim 12 wherein said electromagnetic field establishing means comprises:
    a first electrode, said first electrode overlying said one surface of said first transparent member; and
    a second electrode, said second electrode overlying said one surface of said second transparent member.
14. Device as claimed in claim 13 further comprising:
    means for impressing a control voltage on said first and second electrodes whereby the refractive index of said liquid crystal material is changed, said change being dependent upon the magnitude and polarity of said control voltage.
15. Device in claim 13 further comprising:
    means, between said first and said second electrode and said liquid crystal material, for matching the refractive indices thereof.
16. Device as claimed in claim 15 further comprising:
    means, between said first electrode and said first transparent member, for matching the refractive indices thereof; and
    means, between said second electrode and said second transparent electrode, for matching the refractive indices thereof.
17. A liquid crystal optical switching device comprising:
    a first transparent member having an optically flat surface and having first and second ports, each said port including means, extending into said first transparent member at about the critical angle to said optically flat surface, for receiving an optical fiber and oriented such that a light beam entering via one of said ports and internally reflected by said optically flat surface exits said first transparent member via the other said port, said first transparent member having an electrode overlying said optically flat surface;
    a second transparent member substantially identical to said first transparent member, said first and second transparent members being spaced apart and having liquid crystal material disposed between said optically flat surfaces thereof; and
    means for switching at least a portion of a light beam entering via any said port of said members from one other of said ports to another one of ports.
18. Device as claimed in claim 17 wherein each said tranparent member includes an input port and an output port.
19. Device as claimed in claim 17 wherein each said port includes a collimating lens.
20. Device as claimed in claim 19 wherein each said optical fiber receiving means includes a blind hole, each said blind hole being cooperatively sized to receive said collimating lens therein.
21. Device as claimed in claim 17 further comprising:
    means for retaining said liquid crystal material between said first and second transparent members.

22. Device as claimed in claim 21 wherein said retention means includes a plurality of spacers, said spacers being substantially completely inert to said liquid crystal material.

23. A liquid crystal optical switching apparatus; said apparatus comprising:
a first liquid crystal optical switching device having first and second transparent members, and said first and second members having a base surface associated therewith, said base surfaces being spaced apart by liquid crystal material, said first transparent member having first input and output ports associated therewith, said second transparent member having a second output port associated therewith;
a second liquid crystal optical switching device, having third and fourth transparent members, each said third and fourth members having a base surface associated therewith, said base surfaces spaced apart by liquid crystal material, said third transparent member having third input and output ports associated therewith, said fourth transparent member having fourth input and output ports associated therewith;
means, associated with each said input and output port having means, extending into said transparent member associated therewith, for receiving an optical fiber;
means for sustaining an electromagnetic field in said liquid crystal material;
a first optical path between said first output port and said third input port; and
a second optical path between said second output port and said fourth input port.

24. Apparatus as claimed in claim 23 wherein said second transparent member further comprises:
a second input port.

25. Apparatus as claimed in claim 24 wherein said optical fiber receiving means includes a blind hole extending into said members associated therewith at about the critical angle.

26. Apparatus as claimed in claim 25 further comprising:
means, associated with each said port and disposed in each said blind hole, for collimating a light beam passing therethrough.

27. Apparatus as claimed in claim 23 wherein said electromagnetic field sustaining means includes first, second, third and fourth electrodes overlying said base surfaces.

28. Apparatus as claimed in claim 27 further comprising
means for matching the refractive indices of each said electrode and said liquid crystal material.

29. Apparatus as claimed in claim 27 further comprising:
means for matching the refractive indices of said electrodes and said base surfaces associated therewith.

* * * * *